June 19, 1934.   W. HOLMES   1,963,303
PRINTING MECHANISM FOR USE WITH METERS AND OTHER MEASURING INSTRUMENTS
Filed Feb. 25, 1931   8 Sheets-Sheet 1

W. Holmes
INVENTOR

By: Marks Klen
Attys.

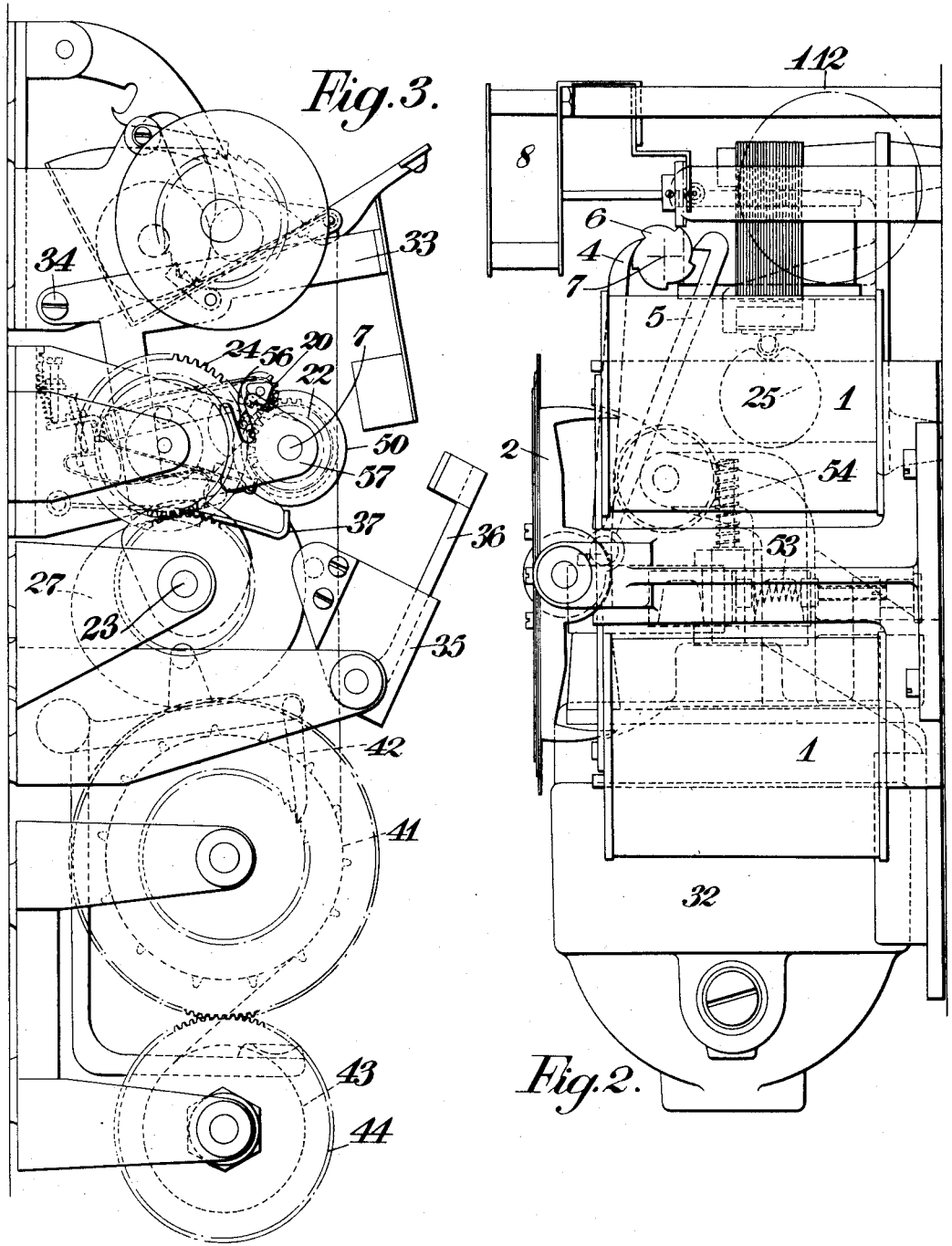

June 19, 1934.   W. HOLMES   1,963,303
PRINTING MECHANISM FOR USE WITH METERS AND OTHER MEASURING INSTRUMENTS
Filed Feb. 25, 1931   8 Sheets-Sheet 3

W. Holmes
INVENTOR

By Marks & Clerk
ATTYS.

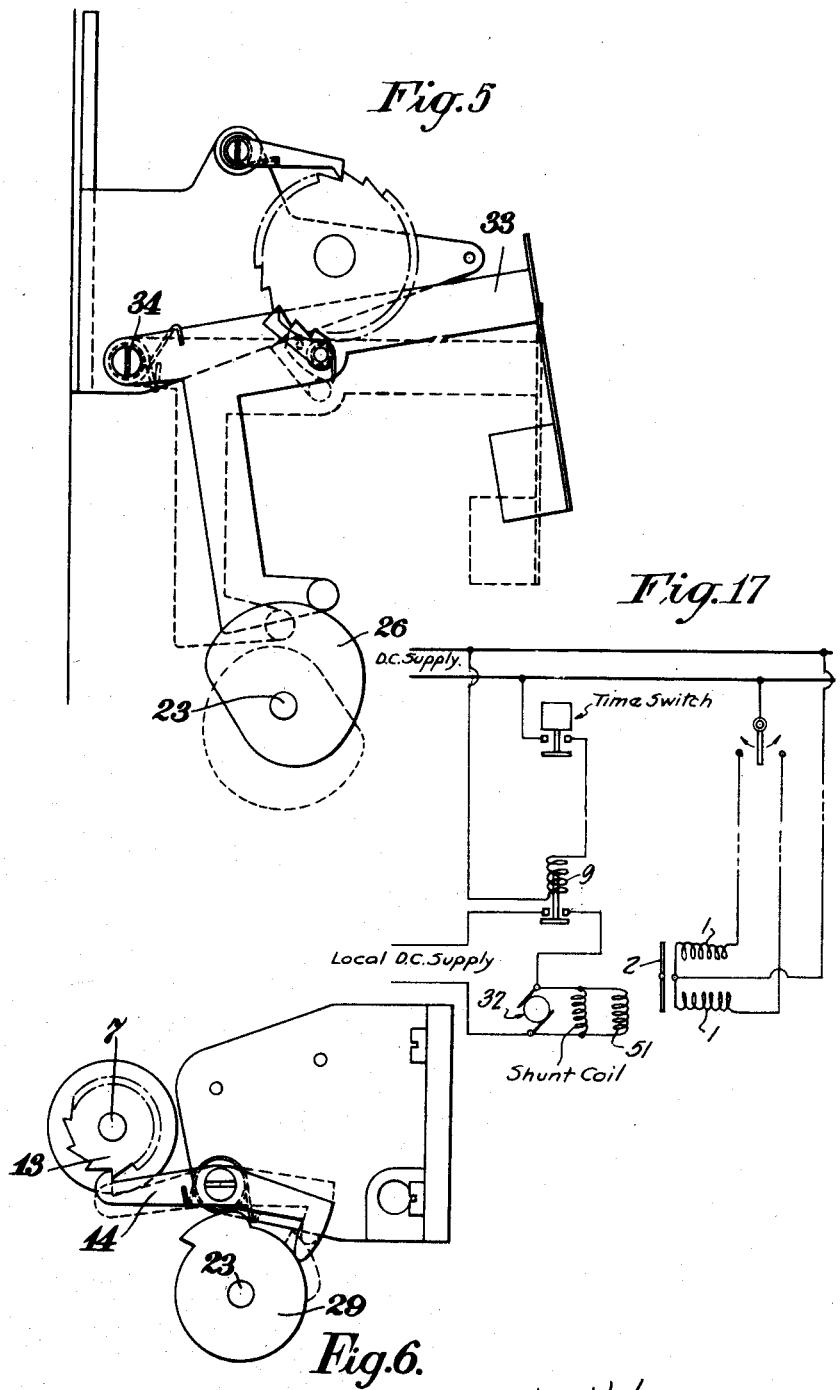

June 19, 1934.  W. HOLMES  1,963,303
PRINTING MECHANISM FOR USE WITH METERS AND OTHER MEASURING INSTRUMENTS
Filed Feb. 25, 1931  8 Sheets-Sheet 5

W. Holmes
INVENTOR

By Marks & Clerk
Attys.

June 19, 1934.  W. HOLMES  1,963,303
PRINTING MECHANISM FOR USE WITH METERS AND OTHER MEASURING INSTRUMENTS
Filed Feb. 25, 1931   8 Sheets-Sheet 6
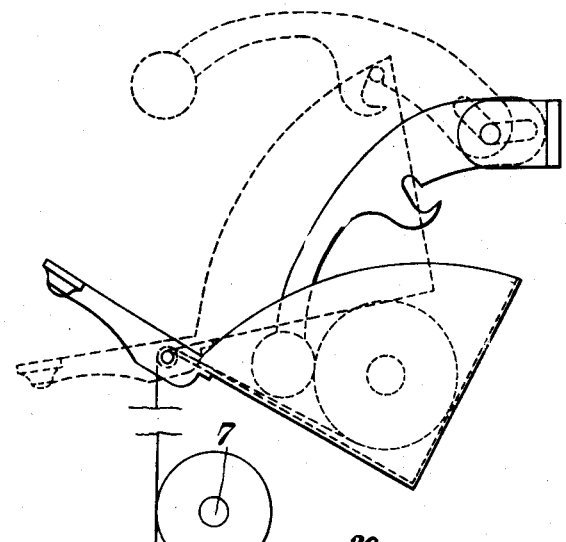
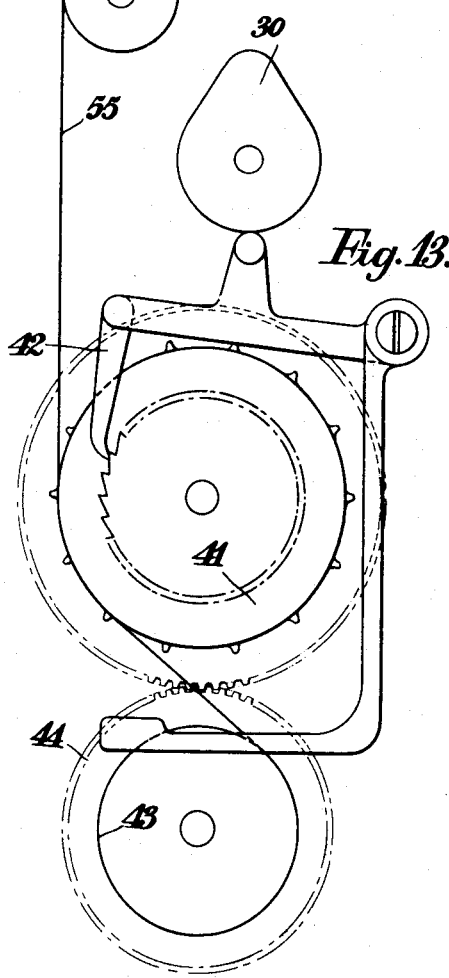
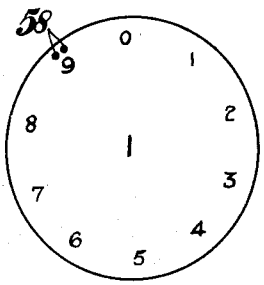
Fig.14.
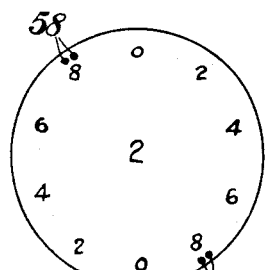
Fig.15.
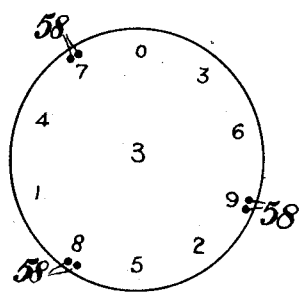
Fig.16.
W. Holmes
INVENTOR
By: Marlo & Teu
Attys.

June 19, 1934.  W. HOLMES  1,963,303
PRINTING MECHANISM FOR USE WITH METERS AND OTHER MEASURING INSTRUMENTS
Filed Feb. 25, 1931  8 Sheets-Sheet 7

W. Holmes
INVENTOR
By: Marks & Clerk
Attys.

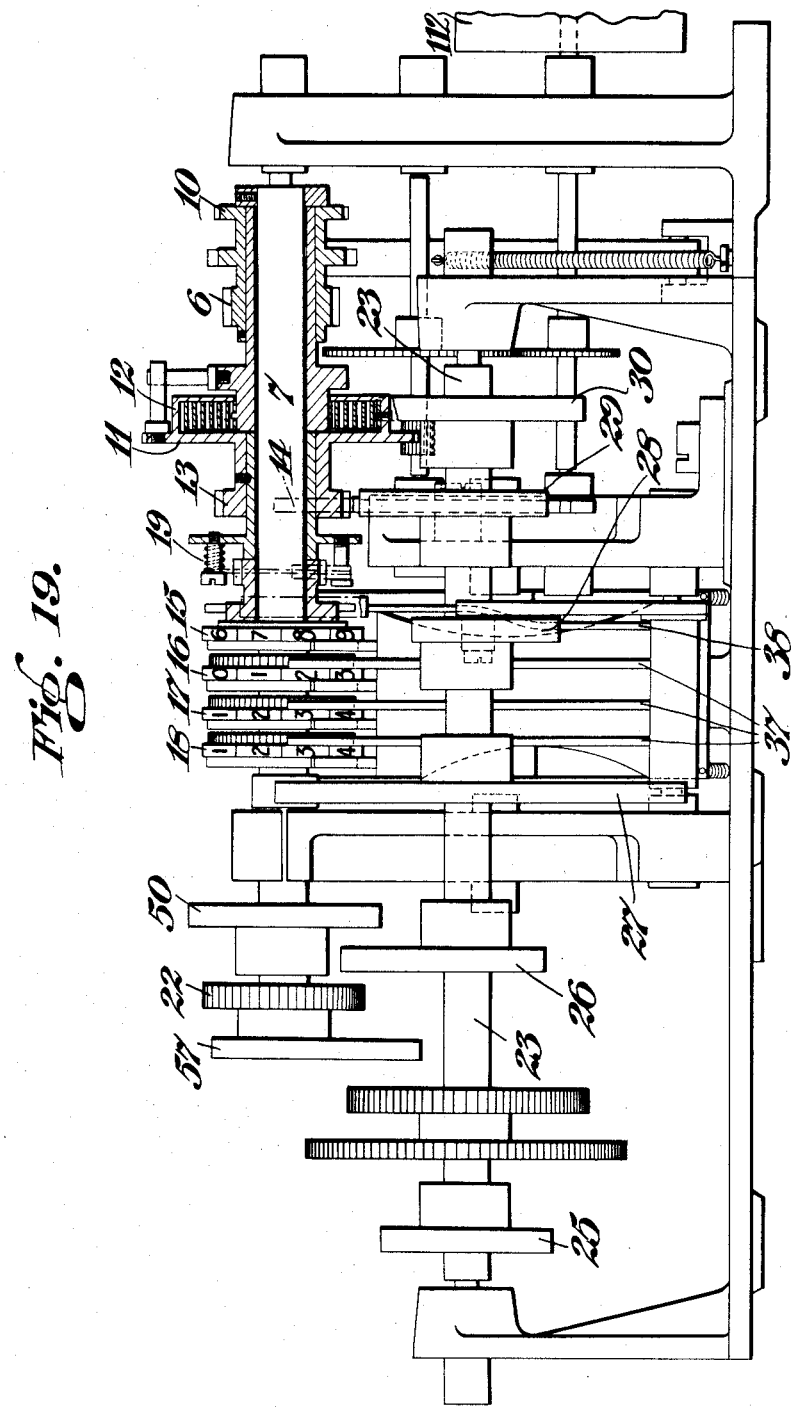

Patented June 19, 1934

1,963,303

UNITED STATES PATENT OFFICE 1,963,303

PRINTING MECHANISM FOR USE WITH METERS AND OTHER MEASURING INSTRUMENTS

Wilfred Holmes, Hollinwood, England, assignor to Ferranti Inc., New York, N. Y.

Application February 25, 1931, Serial No. 518,227
In Great Britain March 12, 1930

2 Claims. (Cl. 234—35)

This invention relates to printing mechanism for use with meters and other measuring instruments.

The invention refers mainly but not exclusively to printometers for use as accessories to maximum demand indicators for summation metering of electrical power circuits in which the summation figures are printed periodically on a slowly-moving chart.

The invention may be applied to the recording of any succession of mechanical operations or to other purposes.

The invention consists in printing mechanism for recording a succession of mechanical movements, e. g. the rotation of an electricity meter rotor including in combination a cyclometer counting mechanism actuated by impulses received from such movements, and a time switch device adapted to effect printing operations at predetermined intervals of time.

The invention further consists in printing mechanism as set forth above, including a spring storage device by which impulses received during resetting operations of said cyclometer counting mechanism are not lost, a fan preferably being also included to avoid jarring of the mechanism upon release of the spring storage device.

The invention further consists in printing mechanism as set forth above, including also means enabling the readings of the unit wheel of the cyclometer counting mechanism to be varied without the use of gear wheels.

The invention also consists in printing mechanism for recording a succession of mechanical movements substantially as hereinafter described with reference to the accompanying drawings.

In applying the present invention to, say, a single electricity meter a single set of contacts on the meter may be employed to control impulses sent to a printometer proportionally to the meter load at any instant, but in the case of summated power, contacts on each meter are necessary. These transmit their electrical impulses to a summation meter (detailed in another specification) which in turn controls the supply to the printometer.

Electrical impulses are received over a number of wires, the impulses being constant in magnitude and occurring at intervals dependent entirely on the total load as read on the meter or meters. One impulse then represents a given number of kWh or kVAh, or either to some multiple of ten.

Referring to the accompanying diagrammatic drawings:—

Figures 2 and 3 are end views thereof viewed from opposite ends.

Figure 5 is a transverse sectional view illustrating the printing ribbon carrier frame and its operating cam.

Figure 6 is a transverse sectional view illustrating the pawl and ratchet wheel serving to prevent transmission of impulses to the printing wheels during printing operations.

Figure 13 is a vertical transverse sectional view illustrating convenient paper feed mechanism.

Figures 14, 15 and 16 illustrate alternate printing wheel markings.

Fig. 17 is a diagrammatic view of the electrical control circuit.

Fig. 19 is a side elevational detail partly in longitudinal section of the arrangement shown in Fig. 18.

Figure 1:
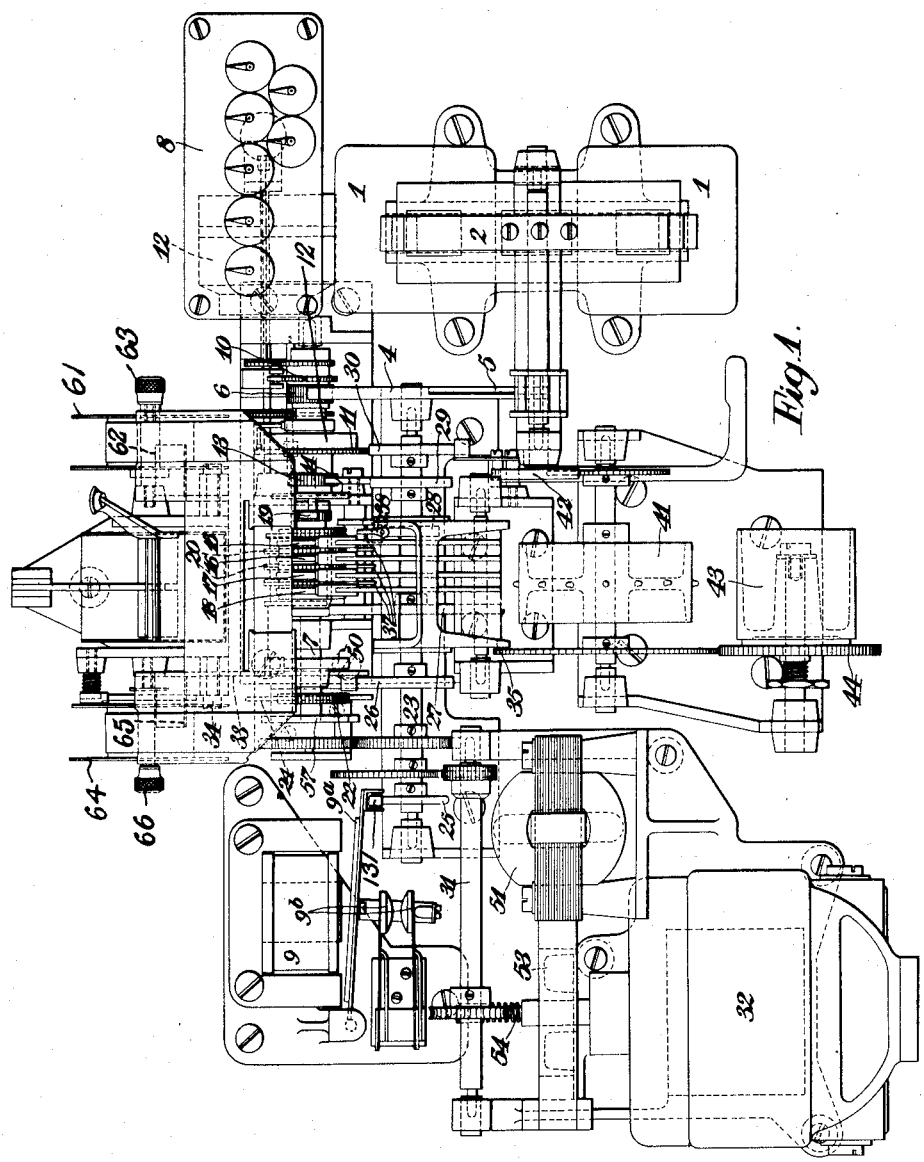
Figure 1 illustrates a front view of one convenient construction in accordance with the present invention.
Figure 4:
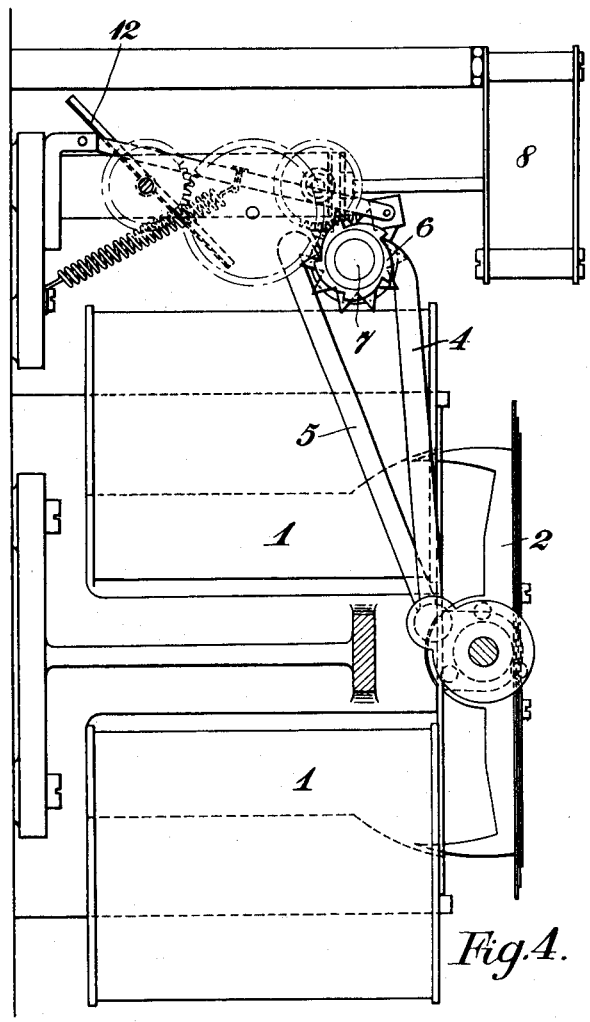
Figure 4 is a transverse sectional view illustrating the ratchet feed device.
Figures 7, 8:
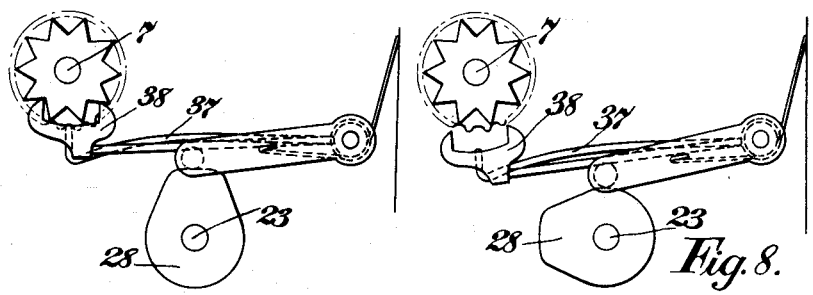
Figures 7 and 8 illustrate convenient means for locking the printing wheels during printing.
Figures 9, 10:
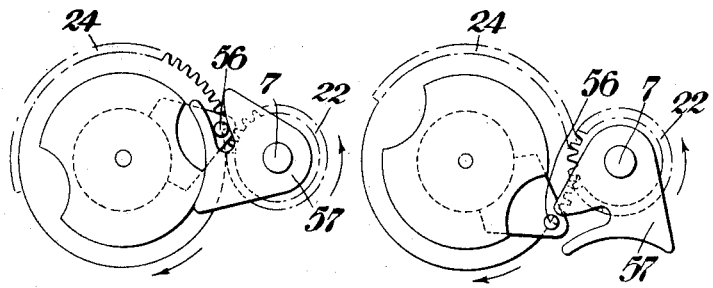
Figures 9 and 10 are vertical transverse sectional views illustrating convenient Geneva mechanism.
Figure 11:
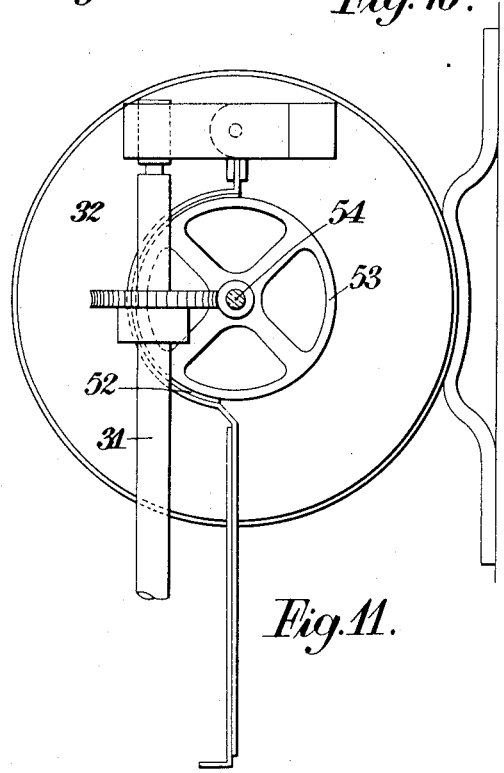
Figure 11 is a plan view illustrating the motor and friction brake.
Figure 12:
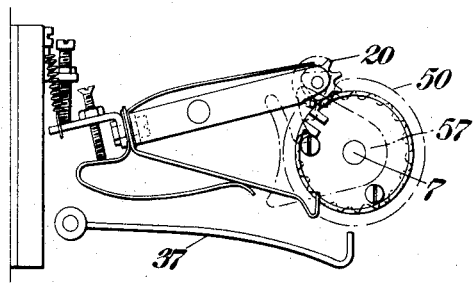
Figure 12 is a vertical transverse sectional view illustrating the printing wheels, their intermediate driving pinions and their braking springs.
Figure 18:
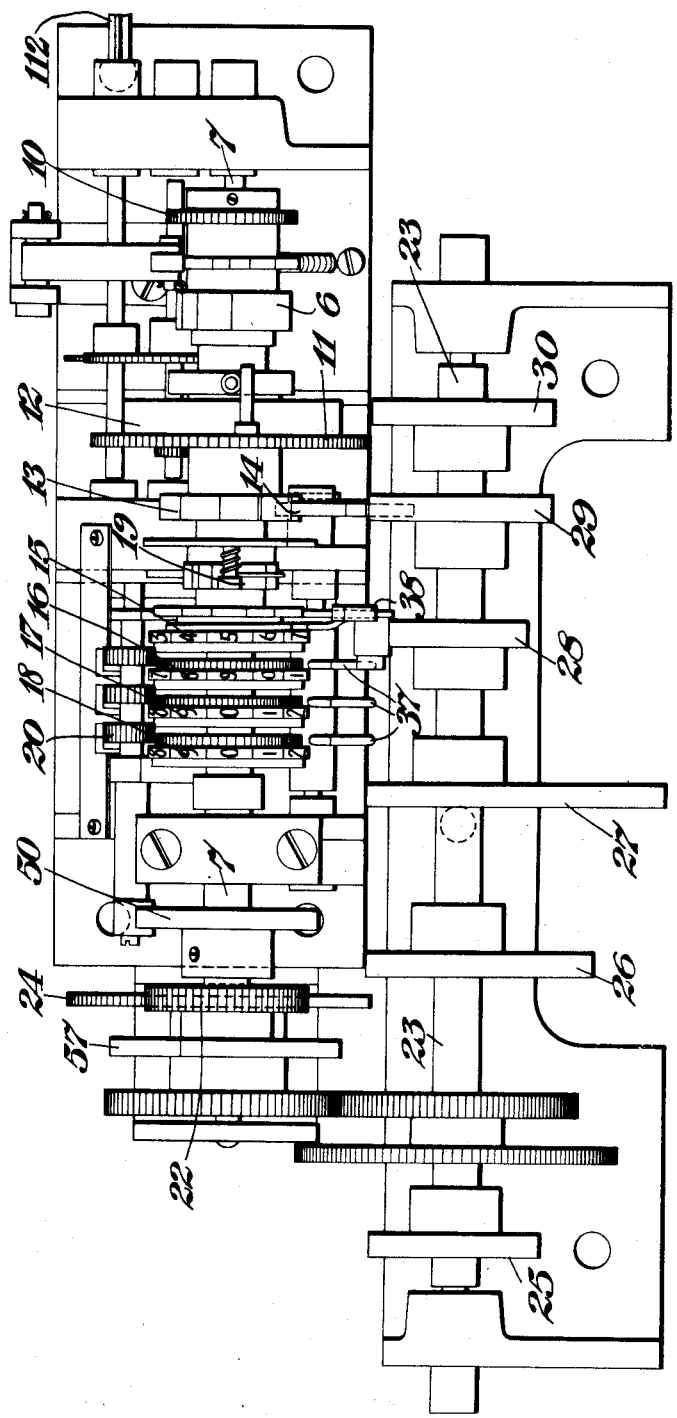
Fig. 18 is an enlarged front view of the digit printing mechanism and associated parts shown centrally in Fig. 1.

Referring to the example illustrated in Figures 1 to 13 an electromagnetic device is arranged with an oscillating armature 2 so that one operating coil 1 pulls the armature one way and the other in the reverse direction. The operating coils are solenoids with the armature 2 so shaped that an even pull is obtained without excessive jarring as the armature reaches the extent of its stroke.

The oscillating motion of the armature is transmitted to a ratchet wheel 6 by means of two pawls 4, 5, so that one movement of the armature in either direction causes a partial rotation of the ratchet wheel 6 equal to one tenth of a revolution.

An electric clock (not shown), or if required any other very accurate clock, is an essential part of the equipment, and is required to be fitted with contacts so that at every given period an impulse from a local supply is transmitted to the printometer.

A relay comprising an electromagnet 9, armature 9a and contacts 9b is provided which when operated by said clock impulses closes the circuit of a motor 32 which is run from a local electricity supply circuit. The motor 32 runs at an approximately constant speed, and is geared so that a cam-shaft 23 rotates completely in a few seconds. The relay coil 9 is only required to carry a very small current, the larger current operating the motor being controlled by the relay contacts 9b.

The ratchet wheel 6 is rotationally freely mounted upon a shaft 7 but is geared to a registering train 8 by gear wheels 10. The ratchet wheel 6 is also connected to the wheel 11 by way of a spiral spring 12′ disposed within a casing 12 of wheel 11, this spring providing for the storage of impulses received during printing operations.

The wheel 11 is connected to a fly 112 by suitable gearing so that when a ratchet wheel 13 rigid with the hub 11′ of the wheel 11 is released by a pawl 14 the too sudden release of the spring energy is prevented.

The wheel 13 is connected to a digit printing wheel 15 through the intermediary of a pawl and ratchet connection 19 and the wheels 15, 16, 17 and 18 are interconnected by intermediate pinions 20 in the usual manner. (Fig. 3).

The shaft 7 carrying the wheels 15, 16, 17 and 18 is adapted to be rotated by a toothed wheel 22 adapted to mesh with a mutilated toothed wheel 24 which in turn is driven from the cam shaft 23. (Fig. 3).

The cam shaft 23 which carries six cams 25, 26, 27, 28, 29 and 30 is adapted to be rotated by an intermediate shaft 31 which in turn is rotated by the motor 32 through the worm 54.

The cam 25 comprises a circular disc at one point in the circumference of which a depression is formed to allow the roller 131 of the relay armature 9a to occupy the normal position illustrated in Figure 1.

The cam 26 (Figure 5) serves to oscillate the printing ribbon carrier frame 33 about its pivots 34.

The cam 27 (Figure 3) serves to oscillate the frame 35 associated with the printing hammers 36.

The cam 28 (Figures 7 and 8) controls the movement of locking prongs 37 and a locking fork 38.

The cam 29 (Figure 6) controls the movement of a locking pawl 14 operating in conjunction with ratchet wheel 13.

The cam 30 (Figure 13) operates a paper feed roll 41.

The printing wheels 15, 16, 17, 18 are all free to rotate on their spindle 7, but for resetting the shaft 7 is rotated by the motor 32 and a slot (not shown) in the shaft 7 engages pawls fixed to the sides of the printing wheels so that by complete rotation of the shaft the wheels are caught from whatever position they were in for printing and all are reset to zero. At the same time the cam 50 raises the pinions 20 interconnecting the wheels so that each may be rotated separately, instead of in mesh as for ordinary counting.

Prior to the actual printing and during this operation the pawl 14 engages the ratchet wheel 13, thus holding the wheel 11 stationary whilst during the resetting to zero of the printing means the prongs 37 and fork 38 are held out of engagement with their associated parts.

According to this example the actual printing operation occupies about one quarter of the total time for printing and resetting, while the actual resetting of the printing wheels occupies one half of the total time. Since for the purpose of resetting, the shaft 7 on which the printing wheels are mounted has to rotate one complete revolution, a gear ratio of 2:1 is incorporated between the cam shaft 23 and the shaft 7, so that for half a revolution of the former the latter will be rotated a complete revolution. Further, the printing wheel shaft must not begin to rotate until the cam shaft has rotated one quarter of a revolution, i. e. after the printing operation has taken place. Accordingly, the drive between the two shafts is obtained by means of Geneva mechanism 22, 24, 56, 57 in co-operation with ordinary gear wheels, the driving wheel 24 of which has teeth on only half its periphery and so displaced with relation to the wheel 22 it is driving, i. e. on the printing wheel shaft 7, that the drive does not begin until one quarter revolution of the cam shaft 23 has taken place. The Geneva gear serves to take up the drive by means of the pin 56 on the wheel 24 and the slot in the sector 57 rigid with the wheel 22, thereby preventing banging of the teeth on the wheels 22 and 24.

A carbon ribbon 60 is wound on a spool 61 similar to a typewriter spool, placed on a spindle 62 and secured into position by a nut 63. The end of the ribbon is then threaded along the carrier 33, and finally wound on a spool 64 secured on a shaft 65 by means of another nut 66. Looking at Figure 1, the spool 61 is free to rotate on its spindle 62, while the spool 64 is keyed on the shaft 65. Therefore, when the cam 26 actuates the carrier 33, the ratchet wheel fixed to the shaft 65 rotates 65 and consequently 64. By this means, the ribbon 60 is urged forward the requisite amount.

In operation under normal conditions the mechanism occupies the position indicated in Figures 1, 2 and 3 and as the impulses are received by the solenoids 1 the armature 2 is rocked, thus progressively moving the ratchet wheel 6 and also operating the registering train 8. Under these conditions the rotation of the ratchet wheel 6 is also transmitted through the spring 12′ in the casing 12 to the ratchet wheel 13 and thence to the digit wheel 15. The impulses are thus indicated on the train 8 and on the printing wheels 15, 16, 17 and 18. At the end of a predetermined period of time as determined conveniently by a clock movement (not shown) a current impulse is transmitted to the relay 9, thereby raising the armature 9a and completing the circuit of the motor 32. The current at the same time passes through the brake release solenoid 51 whereby the brake band 52 associated with a brake drum 53 on the motor shaft 54 is withdrawn from contact. The motor now rotates and in turn rotates the intermediate shaft 31, cam shaft 23. As this motion takes place the following operations are involved:—The armature 9a of the relay 9 is maintained in raised position by the cam 25 so that the current supplied to the relay may be discontinued; the ratchet wheel 13 is locked by the pawl 14 actuated by the cam 29; the fork 38 and prongs 37 are raised so as to prevent further rotation of the printing wheels; the printing ribbon is lowered into position in front of the printing wheels by the cam 26 (the paper strip 55 upon which the record is to be made already resting in position in contact with the front of the printing wheels); the printing hammer frame 35 moves quickly backwards through the action of the cam 27, thus throwing the printing hammers 36 towards the printing wheels; the fingers 37 and fork 38 are removed from their locking position; the Geneva movement 22, 24, 56, 57 now operates to effect one complete revolution of the printing wheel shaft 7; during this rotation the printing wheels are all returned to zero, the intermediate pinions 20 conveying the drive from the digits wheel to the tens wheel, the tens wheel to the hundreds wheel and from the hundreds wheel being meanwhile moved out of mesh by means of the cam 50; the printing ribbon is returned to its original position and during this movement the pawl fixed to the ribbon carrier 33 rotates a ratchet wheel thereby urging the ribbon forward an increment; the locking pawl 14 is moved to release the ratchet wheel 13. During the rotation of the printing wheel shaft 7 the cam 30 oscillates the ratchet 42 to effect a forward feed motion of the printing paper strip 55.

It will be noted that when the ratchet wheel was arrested further impulses received by the solenoids 1 could not be transmitted to the printing wheels but the impulses are stored up in the spring within the spring casing 12 of the wheel 11, these being released and conveyed to the digit wheel 15 immediately the ratchet wheel 13 is again released by the pawl 14. This release of the spring energy is damped by the air vane or fly 112. The final action which takes place during one complete rotation of the cam shaft 23 is the releasing of the armature 9a to open the motor circuit which has been maintained closed during the whole of the revolution.

The mechanism now occupies the same position as that indicated in Figures 1, 2 and 3, one complete cycle of operations having been performed.

The paper 55 is wound on to a drum 43 which is connected to a wheel 44 by a friction clutch so that variations in the diameter of the roller as the paper is wound thereon are compensated for.

Ordinary known cyclometer mechanism consists of one or more wheels, reading units, tens, hundreds, etc., according to the number of wheels, each wheel bearing numbers on its periphery or face near the rim reading from 0 to 9, ten in all, and the units wheel being so interconnected to the tens wheel that one revolution of the units wheel carries the tens wheel forward one tenth of a revolution, and similarly for the tens and hundreds wheels.

If it is required to move the units wheel more than one tenth of a revolution for each impulse from the electrical drive (from the integrating meter or meters) gearing is normally necessary, which is detrimental to positive and easy running and introduces backlash and requires more power for driving.

An important feature of the present invention resides in the provision of a device for varying the reading obtainable per impulse without the use of gear wheels.

Convenient means of making this one tenth of a revolution read more than one unit according to the present invention comprises the alteration of the interval between successive numbers from unity (i. e. 1—2—3—4 etc.) to the figure previously required, which may be any number between 2 and 9, both inclusive.

If it is required that one impulse shall read 2, while still maintaining the same drive of one tenth of a revolution, the units wheel reads 0—2—4—6—8—0—2—4—6—8 and as one half a revolution corresponds to ten units it is arranged with extra interconnecting pins driving the tens wheel so that the tens wheel is urged forward twice for one revolution of the units wheel, which in this case reads 20, as required (= ten impulses X factor of 2).

Figure 14 illustrates an ordinary units wheel while Figure 15 illustrates the wheel with readings re-arranged and furnished with extra driving pins 58.

Similarly for the factor of 3, as illustrated in Figure 16, the units wheel is marked 0—3—6—9—2—5—8—1—4—7 with interconnecting pins at 9, 8 and 7 although actually the pins may be displaced by any angle from these positions depending upon the relative position of the interconnecting wheels and the number printed in the case of a printometer or shown in the case of a cyclometer.

The number of sets of interconnecting pins is equal to the factor in use. It is equally effective for other integers. In the case of a factor of 8, as illustrated in Figure 6, the figures marked are 0—8—6—4—2—0—8—6—4—2 with pins opposite the 8's, 6's, 4's and 2's.

The tens and other wheels are not altered.

It will thus be appreciated that no intermediate gearing is employed, and one impulse still drives the units wheel by one tenth of a revolution, which corresponds to the successive number being brought forward.

Printometers according to present invention can conveniently be incorporated in summation and maximum demand indicators for electricity meters according to British Specification No. 6411 of 1930.

Having now described by invention, what I claim as new and desire to secure by Letters Patent is:—

1. Mechanism for recording a succession of mechanical movements including a train of printing devices, means for advancing said devices by impulses received from said movements, a spring storage device applied between said printing devices and the means for advancing said printing devices, a periodically actuated relay, an electric motor set in motion by said relay, and means actuated by said motor effecting recording of the prevailing reading of the printing devices.

2. Mechanism for recording a succession of mechanical movements as claimed in claim 1, wherein the initial unit of the printing devices to which the impulses are applied is furnished with a plurality of driving means effecting the advance of the device actuated directly thereby more than once per revolution of said driving means.

WILFRED HOLMES.